US012151257B2

(12) United States Patent
Chen et al.

(10) Patent No.: US 12,151,257 B2
(45) Date of Patent: Nov. 26, 2024

(54) SELF-CLEANING NEGATIVE-PRESSURE EJECTOR

(71) Applicant: HIGHLIGHT TECH CORP., Tainan (TW)

(72) Inventors: Zhi-Hao Chen, Tainan (TW); Ting Tsai, Tainan (TW); Wen-Hsien Chen, Tainan (TW)

(73) Assignee: HIGHLIGHT TECH CORP., Tainan (TW)

( * ) Notice: Subject to any disclaimer, the term of this patent is extended or adjusted under 35 U.S.C. 154(b) by 293 days.

(21) Appl. No.: 17/534,422

(22) Filed: Nov. 23, 2021

(65) Prior Publication Data

US 2023/0158534 A1 May 25, 2023

(51) Int. Cl.

*B05B 15/55* (2018.01)
*B05B 15/52* (2018.01)
*B08B 9/032* (2006.01)

(52) U.S. Cl.

CPC ............ *B05B 15/557* (2018.02); *B05B 15/52* (2018.02); *B08B 9/032* (2013.01); *B08B 9/0326* (2013.01)

(58) Field of Classification Search

CPC ....... B05B 15/52; B05B 15/557; B05B 15/55; B08B 9/032

See application file for complete search history.

(56) References Cited

U.S. PATENT DOCUMENTS

2014/0008457 A1* 1/2014 Bosua ...................... B05B 15/55 239/104
2020/0147634 A1* 5/2020 Pedersen ............... B05B 17/063

FOREIGN PATENT DOCUMENTS

CN 111350699 A * 6/2020 ................ F04F 5/04
JP S 6359337 A * 3/1988
TW M535595 1/2017

OTHER PUBLICATIONS

Machine translation of CN-111350699-A, dated Jun. 30, 2020. (Year: 2020).*

* cited by examiner

*Primary Examiner* — Michael E Barr
*Assistant Examiner* — Kevin G Lee

(57) ABSTRACT

A self-cleaning negative-pressure ejector at least comprises a suction chamber, a jet pipe and a flushing member. A side wall of the suction chamber has at least one suction port for communicating with a first fluid pipeline. An exit port of the jet pipe is disposed in the suction chamber and ejects a second fluid so that a negative pressure is generated in the suction chamber, a first fluid in the first fluid pipeline enters the suction chamber, and a first included angle is between a direction in which the first fluid being sucked into the suction chamber and an ejection direction of the second fluid. The flushing member optionally provides a third fluid to flush the suction chamber and/or the first fluid pipeline.

16 Claims, 14 Drawing Sheets

SELF-CLEANING NEGATIVE-PRESSURE EJECTOR

BACKGROUND OF THE INVENTION

1. Field of Invention

The invention relates to a microbubble generating device, and more particularly to a negative-pressure device for treating the mixing of liquid and gas and removing solid dust in order to prevent blockage of conveying pipes.

2. Description of the Related Art

Process waste gas such as industrial waste gas is generally considered to be the source of various environmental problems. Wet washing towers or scrubbers are often used to trap harmful gases from industrial process waste gas, so the degree of mixing of gas and liquid determines the decontamination ability. In order to increase the degree of mixing, wet scrubbers are divided into spray type, packed tower type, and venturi tube type. Among them, the venturi tube uses the principle of siphon to generate negative pressure to prevent the backflow of harmful gases. Taiwan's utility patent No. M535595 "Delivery tube assembly and gas-liquid mixing stirrer having the same" uses the venturi tube structure to increase the degree of mixing gas with liquid, and uses the flexible tube to prevent blocking by disturbing the solid dust attached on the delivery tube as the water flows. However, the flexible tube will often be broken during the long time usage to cause equipment damage, and the decontamination ability will decrease due to the tube wall being too small and the path being too long. Moreover, this conventional technology will not be able to treat waste gas during maintenance, so it must be shut down for maintenance, which will inevitably lead to the shutdown of the overall manufacturing process. In addition, it may be necessary to have multiple sets of spare equipment, so not only the overall cost will increase, but also the complexity of waste gas treatment will increase.

SUMMARY OF THE INVENTION

In view of the above, an object of the invention is to provide a self-cleaning negative-pressure ejector to solve the above-mentioned problems of the prior art.

In order to achieve the foregoing object, the invention discloses a self-cleaning negative-pressure ejector comprising: a suction chamber, a side wall of the suction chamber having at least one suction port, the suction port being used for communicating with a first fluid pipeline; a jet pipe, an exit port of the jet pipe being disposed in the suction chamber and ejecting a second fluid so that a negative pressure being generated in the suction chamber, and a first fluid in the first fluid pipeline entering the suction chamber, wherein a first included angle is between a direction in which the first fluid being sucked into the suction chamber and an ejection direction of the second fluid; and at least one flushing member used for continuously providing a third fluid to clean the suction chamber and the first fluid pipeline to generate a fixed flushing pressure or intermittently providing the third fluid to clean the suction chamber and the first fluid pipeline to generate a pulsed flushing pressure according to a numerical value of the negative pressure, a time setting or a frequency setting for removing solid particles deposited in the suction chamber and the first fluid pipeline.

Preferably, the third fluid is a gas, a liquid or the gas mixing with the liquid.

Preferably, the third fluid is a liquid and a gas supplied in sequence to remove solid particles deposited in the suction chamber and the first fluid pipeline, and remove a liquid remaining in the suction chamber when the flushing member cleans the suction chamber.

Preferably, the first included angle is 90 degrees.

Preferably, the flushing member supplies the third fluid into the first fluid pipeline and/or the suction chamber in a direction at a second included angle relative to a direction in which the first fluid is sucked into the suction chamber, the second included angle is between 90 degrees and 180 degrees.

Preferably, a numerical ratio of a first distance between the exit port of the jet pipe and a discharge port of the suction chamber to a second distance between the exit port of the jet pipe and the suction port of the suction chamber is between 0.5 and 2.5.

Preferably, the self-cleaning negative-pressure ejector of the invention further comprises a mixing pipe communicated with the suction chamber for mixing the first fluid with the second fluid to produce a mixed fluid; and a diffusion pipe communicated with the mixing pipe for spraying the mixed fluid.

Preferably, a quantity of the at least one flushing member is more than one, and some or all of the flushing members communicate with one another in series, in parallel, or do not communicate with one another.

Preferably, the flushing member is fixedly disposed on the suction chamber and the first fluid pipeline to inject the third fluid into the suction chamber and the first fluid pipeline for removing solid particles deposited in the suction chamber and the first fluid pipeline.

Preferably, the flushing member is movably disposed on the suction chamber and the first fluid pipeline via a movable sleeve member to movably inject the third fluid into the suction chamber and the first fluid pipeline for removing solid particles deposited in the suction chamber and the first fluid pipeline.

Preferably, the movable sleeve member is a rotary socket tube or a flexible sleeve connector.

Preferably, the movable sleeve member and/or the suction chamber is provided with a vibrator.

Preferably, the vibrator is operated continuously or at a predetermined time or at a predetermined frequency or operated when the negative pressure is dropped below a preset value.

Preferably, the suction chamber is provided with a vibrator, and the vibrator is operated continuously or at a predetermined time or at a predetermined frequency or operated when the negative pressure is dropped below a preset value.

Preferably, the movable sleeve member is operated according to the numerical value of the negative pressure, the time setting, or the frequency setting.

Preferably, the suction chamber has a bottom plate rotatably disposed on a bottom of the suction chamber, and at least one fin is disposed on the bottom plate for removing solid particles deposited in the suction chamber and the first fluid pipeline during the rotation of the fin.

Preferably, a height and a position of the fin correspond to the flushing member such that the fin can be rotated by the third fluid ejected out from the flushing member.

Preferably, the bottom plate communicates with a mixing pipe, and at least another fin is disposed on the mixing pipe such that the fin can be rotated by the second fluid ejected out from the jet pipe.

Preferably, the suction chamber has a bottom plate fixedly disposed on a bottom of the suction chamber, and at least one fin is rotatably disposed on the bottom plate.

Preferably, a height and a position of the fin correspond to the flushing member such that the fin can be rotated by the third fluid ejected out from the flushing member In summary, according to the self-cleaning negative-pressure ejector of the invention, one or more of the following advantages can be provided: (1) Capable of generating high negative pressure to suck gas and solving the problem of blockage of solid particles in the fluid pipelines. (2) Having a self-cleaning function capable of performing detersive operation of automatic dust cleaning under a non-stop operation state of the whole equipment. (3) Capable of self-clearing solid blockage on the pipe walls of the negative-pressure ejector and the first fluid pipeline by using gas and/or liquid jets. (4) A direction in which the first fluid being sucked is inclined relative to an ejection direction of the second fluid, thereby capable of preventing solid particles from depositing in the first fluid pipeline. (5) Capable of removing water vapor remaining in the first fluid pipeline during a flushing process and preventing solid particles from depositing by ejecting a third fluid into the first fluid pipeline. (6) A length of the suction chamber can be extended to reduce a frequency of engineering staff cleaning the suction chamber manually. (7) The entire device of the negative-pressure ejector has no consumables, no risk of breakage, has long service life and the components can be replaced conveniently.

In order to enable the examiner to have a further understanding and recognition of the technical features of the invention and the technical efficacies that can be achieved, preferred embodiments in conjunction with detailed explanation are provided as follows.

DETAILED DESCRIPTION OF THE INVENTION

Figure 1:
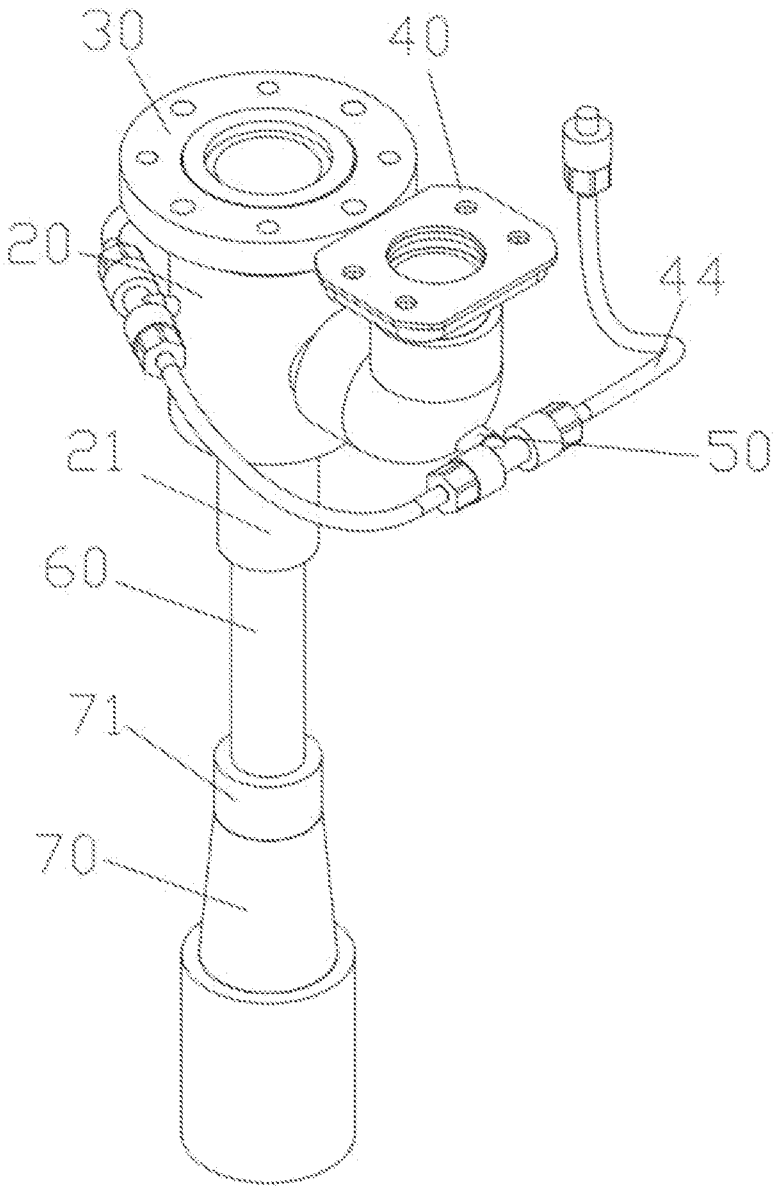
FIG. 1 is a perspective view of a self-cleaning negative-pressure ejector of the invention.
Figure 2A:
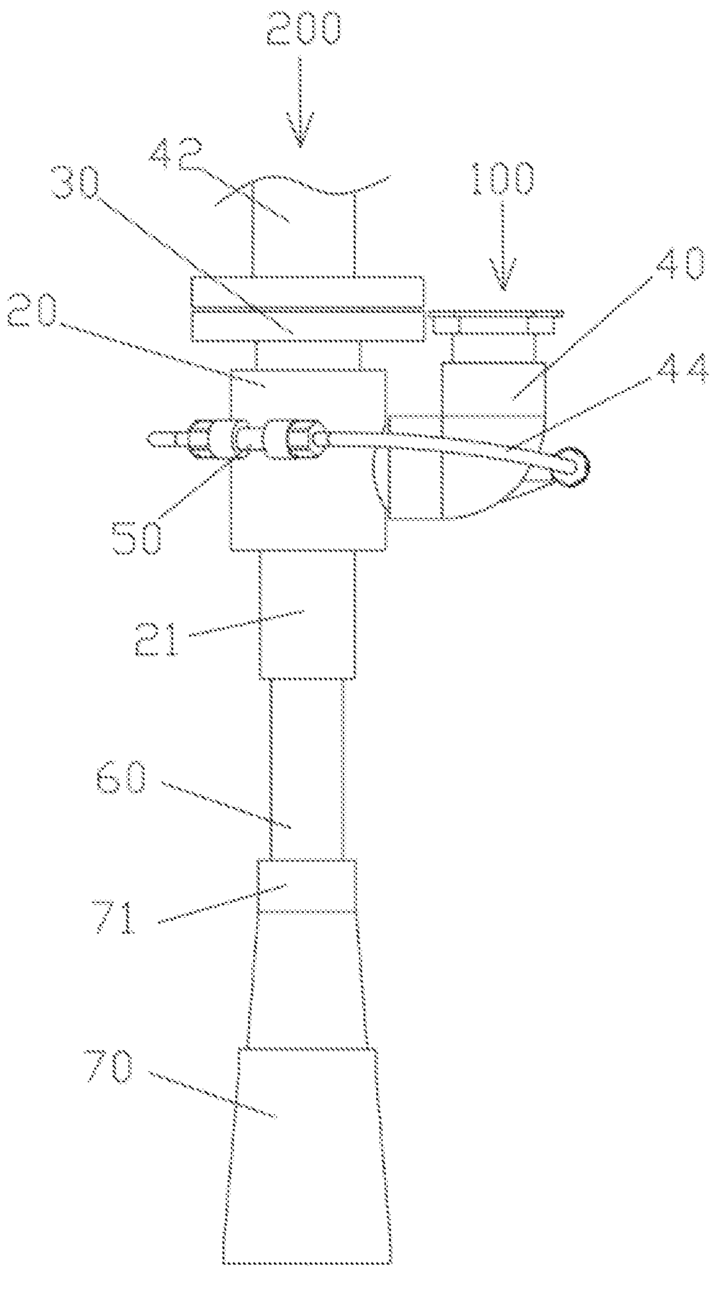
FIG. 2A is a side view of the self-cleaning negative-pressure ejector of the invention, wherein a second fluid pipeline is also drawn.
Figure 2B:
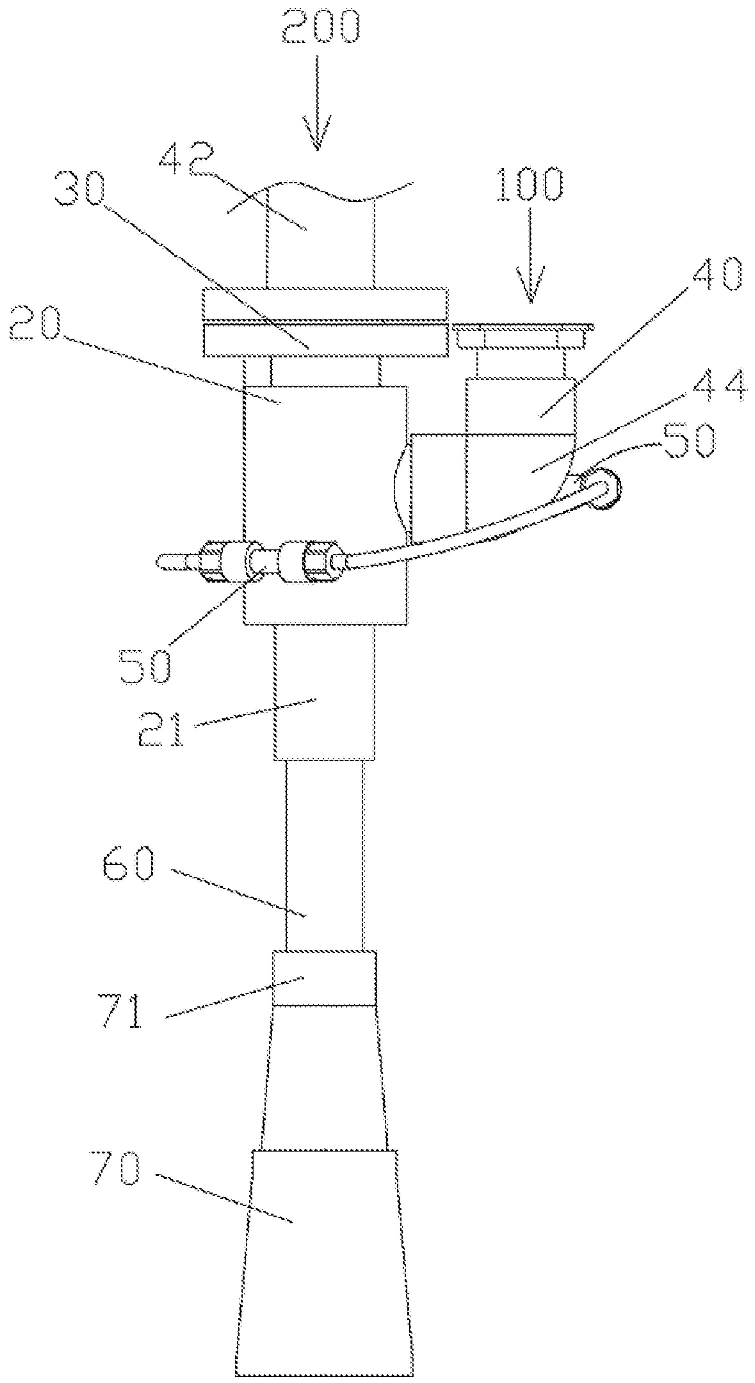
FIG. 2B is a side view of the self-cleaning negative-pressure ejector of the invention, wherein the second fluid pipeline is also drawn, and a length of a suction chamber is increased.
Figure 3:
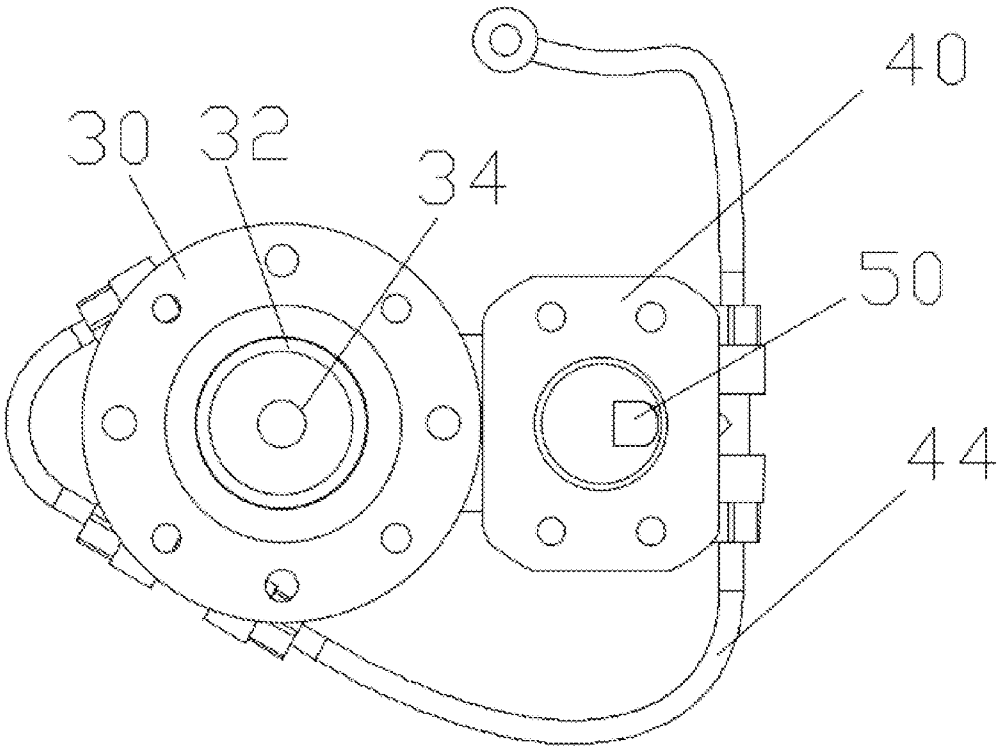
FIG. 3 is a top view of the self-cleaning negative-pressure ejector of the invention.
Figure 4:
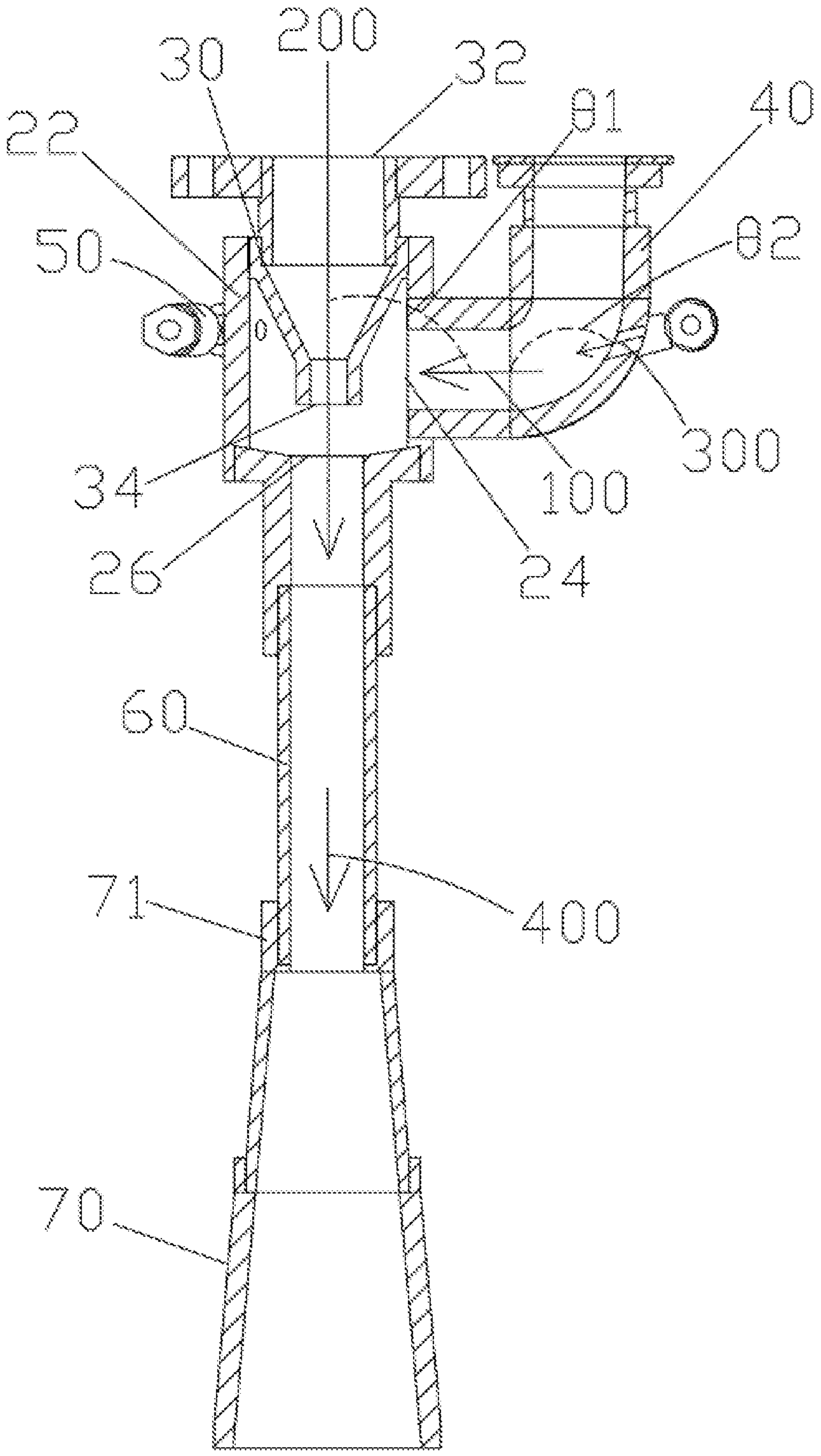
FIG. 4 is a cross-sectional side view of the self-cleaning negative-pressure ejector of the invention viewed from one direction, wherein the negative-pressure ejector is an assembly structure.
Figure 5:
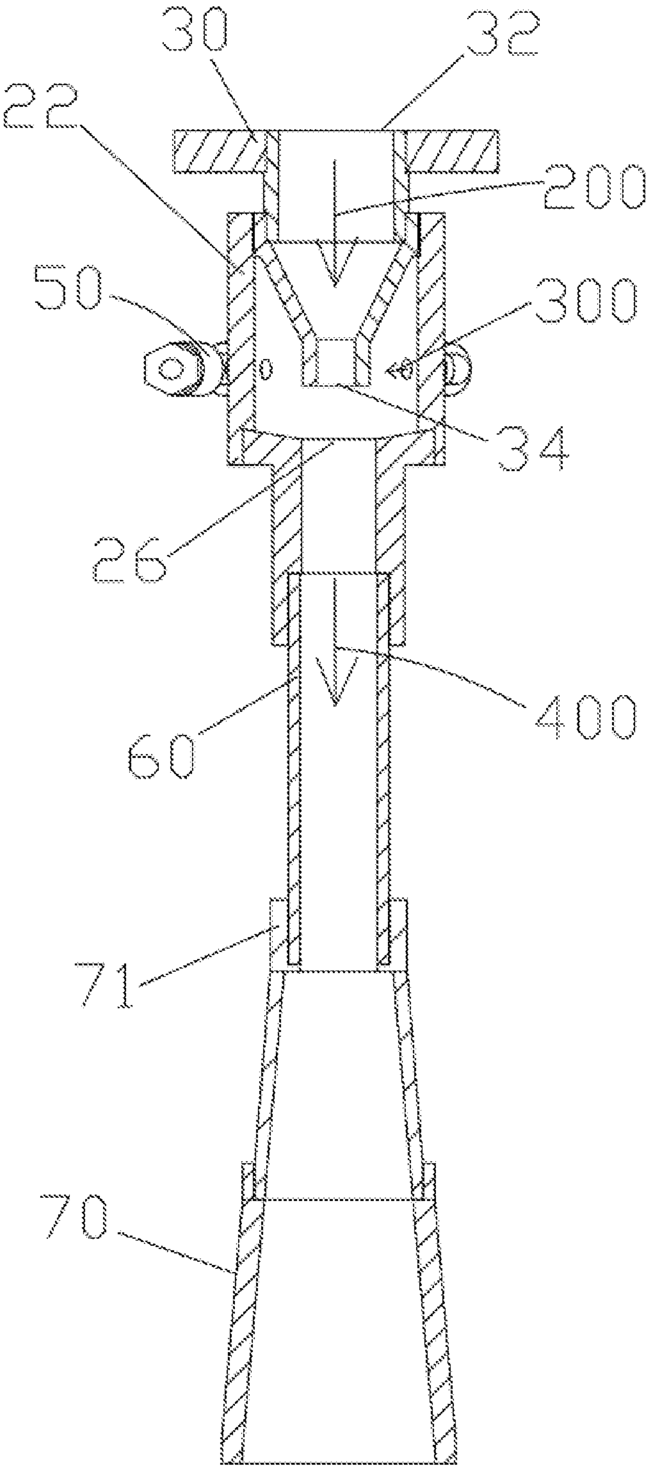
FIG. 5 is a cross-sectional side view of the self-cleaning negative-pressure ejector of the invention viewed from another direction, wherein the negative-pressure ejector is an assembly structure.
Figure 6:
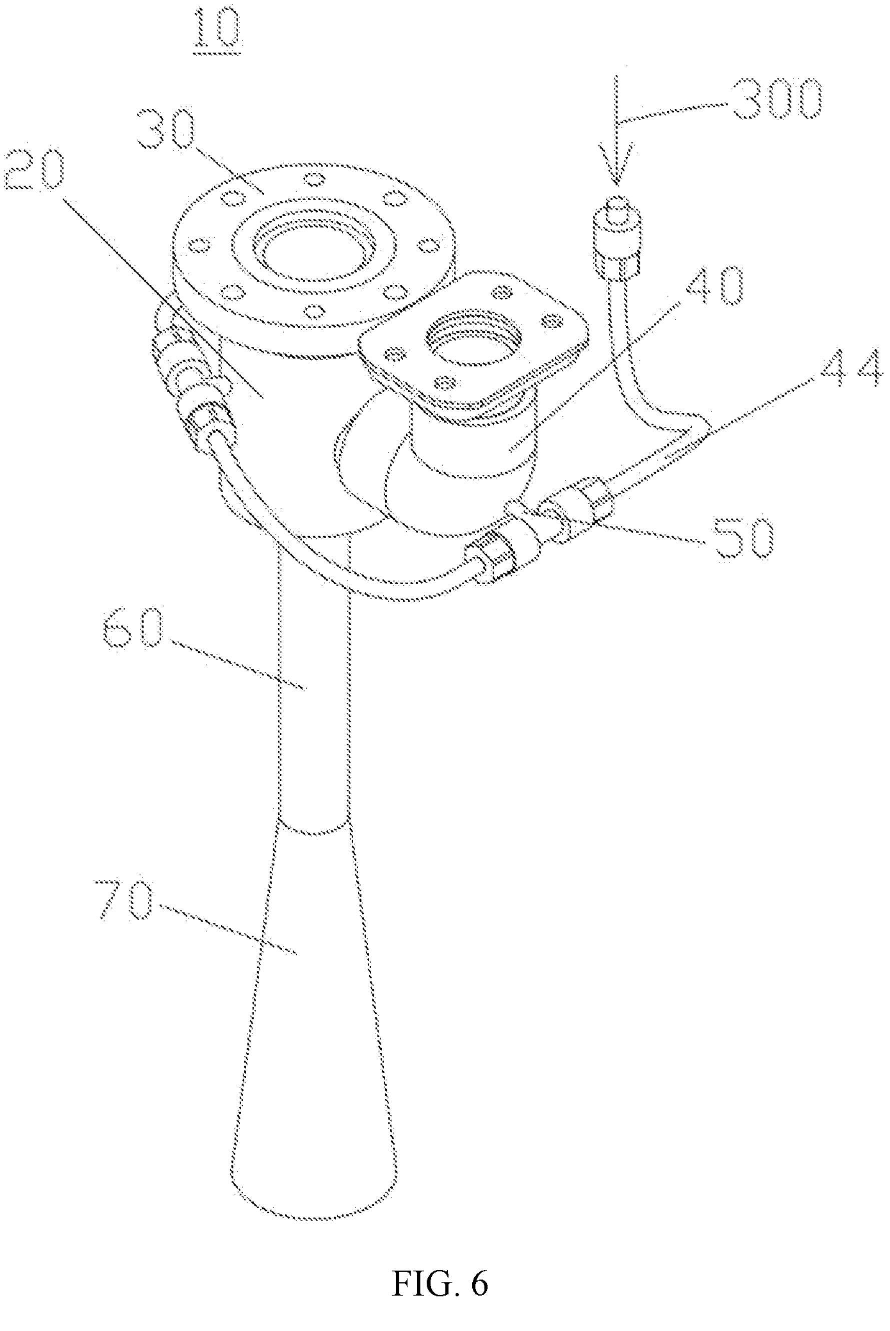
FIG. 6 is a perspective view of the self-cleaning negative-pressure ejector of the invention, wherein the negative-pressure ejector is an integrated structure.

In order to understand the technical features, content and advantages of the invention and its achievable efficacies, the invention is described below in detail in conjunction with the figures, and in the form of embodiments, the figures used herein are only for a purpose of schematically supplementing the specification, and may not be true proportions and precise configurations after implementation of the invention; and therefore, relationship between the proportions and configurations of the attached figures should not be interpreted to limit the scope of the claims of the invention in actual implementation. In addition, in order to facilitate understanding, the same elements in the following embodiments are indicated by the same referenced numbers. And the size and proportions of the components shown in the drawings are for the purpose of explaining the components and their structures only and are not intending to be limiting.

Unless otherwise noted, all terms used in the whole descriptions and claims shall have their common meaning in the related field in the descriptions disclosed herein and in other special descriptions. Some terms used to describe in the present invention will be defined below or in other parts of the descriptions as an extra guidance for those skilled in the art to understand the descriptions of the present invention.

The terms such as “first”, “second”, “third” used in the descriptions are not indicating an order or sequence, and are not intending to limit the scope of the present invention. They are used only for differentiation of components or operations described by the same terms.

Moreover, the terms “comprising”, “including”, “having”, and “with” used in the descriptions are all open terms and have the meaning of “comprising but not limited to”.

A self-cleaning negative-pressure ejector 10 of the invention is not only capable of generating high negative pressure and sucking gas, solving the problem of blockage of solid particles in a fluid pipeline, but also capable of providing a self-cleaning function to avoid the problem of blockage of solid particles caused by long time usage of a suction chamber 20 of the negative-pressure ejector 10. In addition, if a mixed fluid ejected by the negative-pressure ejector 10 of the invention is applied to a processing tank with fluid, gas solubility and solid particle capture rate can be increased by generating microbubbles with a greatly increased surface area per unit volume (surface area divided by volume).

Please refer to FIGS. 1 to 11, the self-cleaning negative-pressure ejector 10 of the invention at least comprises the suction chamber 20 and a jet pipe 30. A side wall 22 of the suction chamber 20 has at least one suction port 24, and the suction port 24 is used to communicate with a first fluid pipeline 40. Wherein the suction chamber 20 is preferably a hollow columnar pipe, and preferably a cylindrical pipe, but the suction chamber 20 is not limited thereto, and other shapes are also applicable to the invention. The jet pipe 30 is preferably a hollow funnel pipe, that is, a structure of the jet pipe 30 is wide at top and narrow at bottom to speed up a flow rate. Opening diameters of openings on two sides of the jet pipe 30 are different, and an opening diameter of an entrance port 32 is preferably larger than an opening diameter of an exit port 34, wherein a pipe wall between the entrance port 32 and the exit port 34 of the jet pipe 30 can be inclined, or can be inclined after extending in parallel, and an inclination angle depends on a distance and an opening diameter between the entrance port 32 and the exit port 34 of the jet pipe 30. A top side of the suction chamber 20 is preferably closed, and a bottom side of the suction chamber 20 has a discharge port 26.

A top end of the jet pipe 30 is the entrance port 32, and a bottom end of the jet pipe 30 is the exit port 34. A body of the jet pipe 30 is partially or completely penetrated in the suction chamber 20, so that the exit port 34 of the jet pipe 30 is disposed in the suction chamber 20, and the entrance port 32 of the jet pipe 30 is communicated with a second fluid pipeline 42 capable of providing a second fluid 200. Therefore, when the second fluid 200 enters the suction chamber 20 from the entrance port 32 of the jet pipe 30 and is ejected from the exit port 34, high flow rate of the second fluid 200 will cause the suction chamber 20 to generate a negative pressure. A numerical value of the negative pressure is, for example, but not limited to, 0 kPa to −100 kPa. By means of a suction force of the vacuum negative pressure phenomenon or a pressure (such as gas pressure) of a first fluid 100 flowing in the first fluid pipeline 40, the first fluid 100 in the first fluid pipeline 40 is capable of entering into the suction chamber 20, and preferably being sucked into the suction chamber 20 perpendicularly or obliquely, so as to avoid deposition of solid particles in the first fluid pipeline 40. One feature of the invention is that a first included angle θ1 is between a direction in which the first fluid 100 being sucked by the negative pressure and enters the suction chamber 20 and an ejection direction of the second fluid 200, wherein the first included angle θ1 is, for example, 90 degrees. However, in other example, the first included angle θ1 may be less than 90 degrees, namely the first fluid 100 may be sucked by the negative pressure and obliquely enters the suction chamber 20.

The design of the invention is capable of speeding up a flow rate to cause the surrounding environment to generate vacuum negative pressure phenomenon to suck out the first fluid 100 (such as process exhaust gas and other gases) in the first fluid pipeline 40, and preventing solid particles from accumulating at an exit of the first fluid pipeline 40. A first distance between the exit port 34 of the jet pipe 30 and the discharge port 26 of the suction chamber 20 is, for example, equal to a second distance between the exit port 34 of the jet pipe 30 and the suction port 24 of the suction chamber 20, so as to obtain better ejection effect, but is not limited thereto. For example, the first distance can also be greater or less than the second distance. In addition, the first fluid 100 can be a gas or a liquid, and the second fluid 200 can be a liquid or a gas. Taking the treatment of process waste gas as an example, the first fluid 100 is preferably a gas such as process waste gas, and the second fluid 200 is preferably a liquid such as water or washing liquid corresponding to the process waste gas. A flow rate of the first fluid 100 ranges from about 200 SLM to 4000 SLM, and a diameter of the first fluid pipeline 40 ranges from about 10 cm to 250 cm. A flow rate of the second fluid 200 ranges from about 200 SLM to 4,000 SLM, and a diameter of the second fluid pipeline 42 ranges from about 10 cm to 250 cm. In addition, the suction chamber 20 of the negative-pressure ejector 10 of the invention can be lengthened (that is, by increasing the first distance between the exit port 34 of the jet pipe 30 and the discharge port 26 of the suction chamber 20) to reduce a frequency of engineering staff cleaning the suction chamber 20 manually. In other words, the longer the first distance between the exit port 34 of the jet pipe 30 and the discharge port 26 of the suction chamber 20, the longer a time interval of engineering staff cleaning the suction chamber 20 manually. For example, a numerical ratio of the first distance to the second distance can be, for example, between 0.5 and 2.5, preferably between 1 and 2.5 or between 0.5 and 1, more preferably 0.86.

The self-cleaning negative-pressure ejector 10 of the invention further optionally comprises a mixing pipe 60, wherein an inlet end of the mixing pipe 60 communicates with the suction chamber 20. In detail, the inlet end of the mixing pipe 60 is preferably communicated with the discharge port 26 of the suction chamber 20. Therefore, when the first fluid 100 and the second fluid 200 enter the suction chamber 20 through the first fluid pipeline 40 and the jet pipe 30 respectively, and enter the mixing pipe 60 from the discharge port 26 of the suction chamber 20, the mixing pipe 60 is capable of mixing the first fluid 100 with the second fluid 200 to produce a mixed fluid 400. Wherein, the mixed fluid 400 preferably has microbubbles so as to achieve a detersive efficacy. The mixing pipe 60 is, for example, a hollow columnar pipe, and preferably a cylindrical pipe, but is not limited thereto, and other shapes are also applicable to the invention. The mixing pipe 60 is preferably a straight pipe, that is, a pipe diameter of the mixing pipe 60 is preferably substantially the same. However, other shapes and forms of the mixing pipe 60 are also applicable to the invention. A length of the mixing pipe 60 can be adjusted according to actual requirements to achieve different mixing effects.

The mixing pipe 60 of the invention can be directly connected to the suction chamber 20. In addition, the mixing pipe 60 can also be indirectly connected to the suction chamber 20. For example, a fixing sleeve 21 can optionally be provided between the mixing pipe 60 and the suction chamber 20 to sleevely connect the mixing pipe 60 with the suction chamber 20 and/or increase a structural stability. For example, the bottom side of the suction chamber 20 of the invention can be a bottom plate 23 with the discharge port 26, and the bottom plate 23 can be detachably connected with the side wall 22 or integrally formed with the side wall 22. The mixing pipe 60 can communicate with the suction chamber 20 via the fixing sleeve 21, for example. Alternatively, the bottom side of the suction chamber 20 can also be formed by the fixing sleeve 21, wherein a top end of the fixing sleeve 21 is connected to a bottom end of the suction chamber 20, and a bottom end of the fixing sleeve 21 is connected to the mixing pipe 60, so that the mixing pipe 60 communicates with the suction chamber 20 via the fixing sleeve 21. However, the above structure is only an example, and is not intended to limit the invention.

Figure 9:
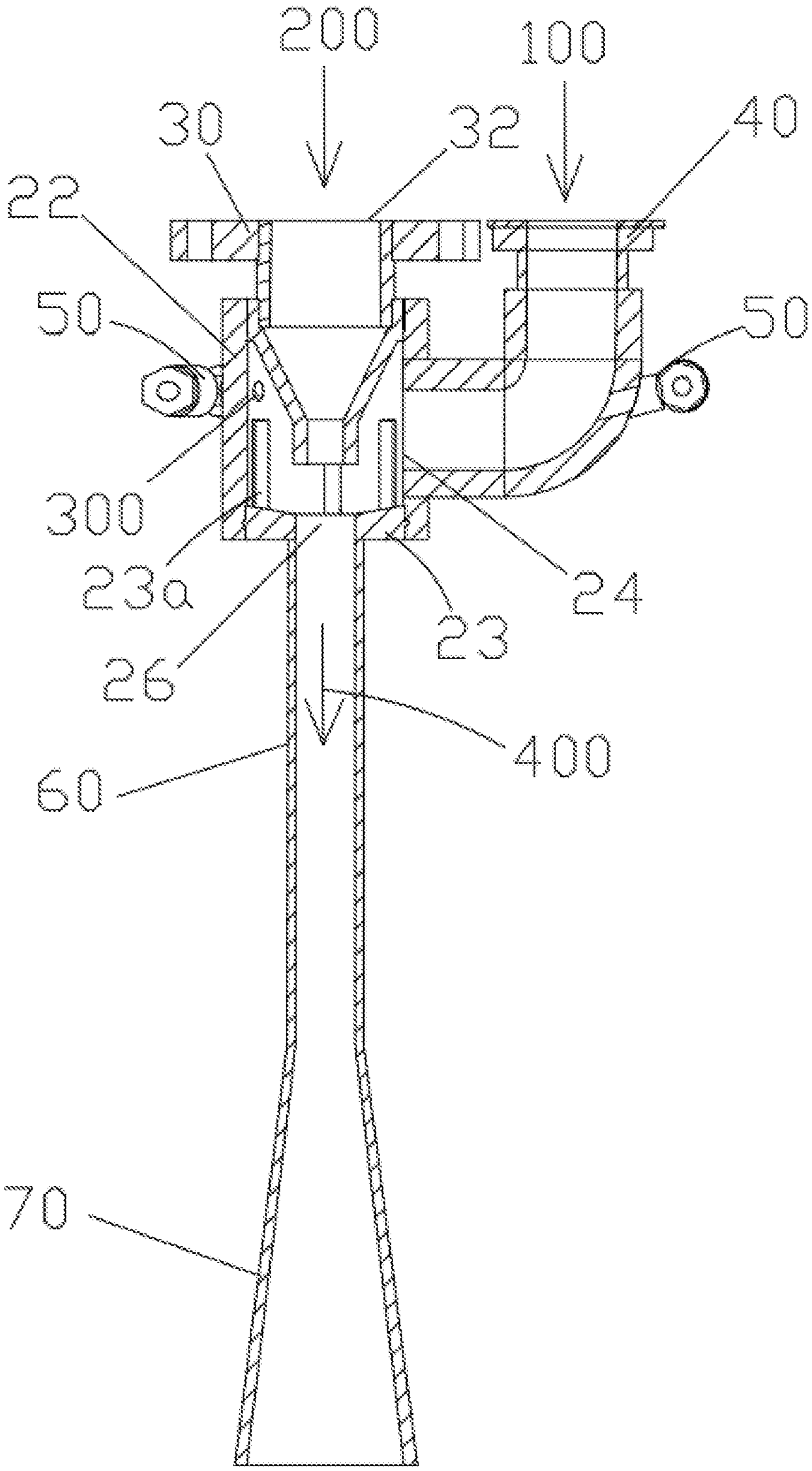
FIG. 9 is a cross-sectional side view of the self-cleaning negative-pressure ejector of the invention showing a schematic diagram of an automatic rotation design.
Figure 10:
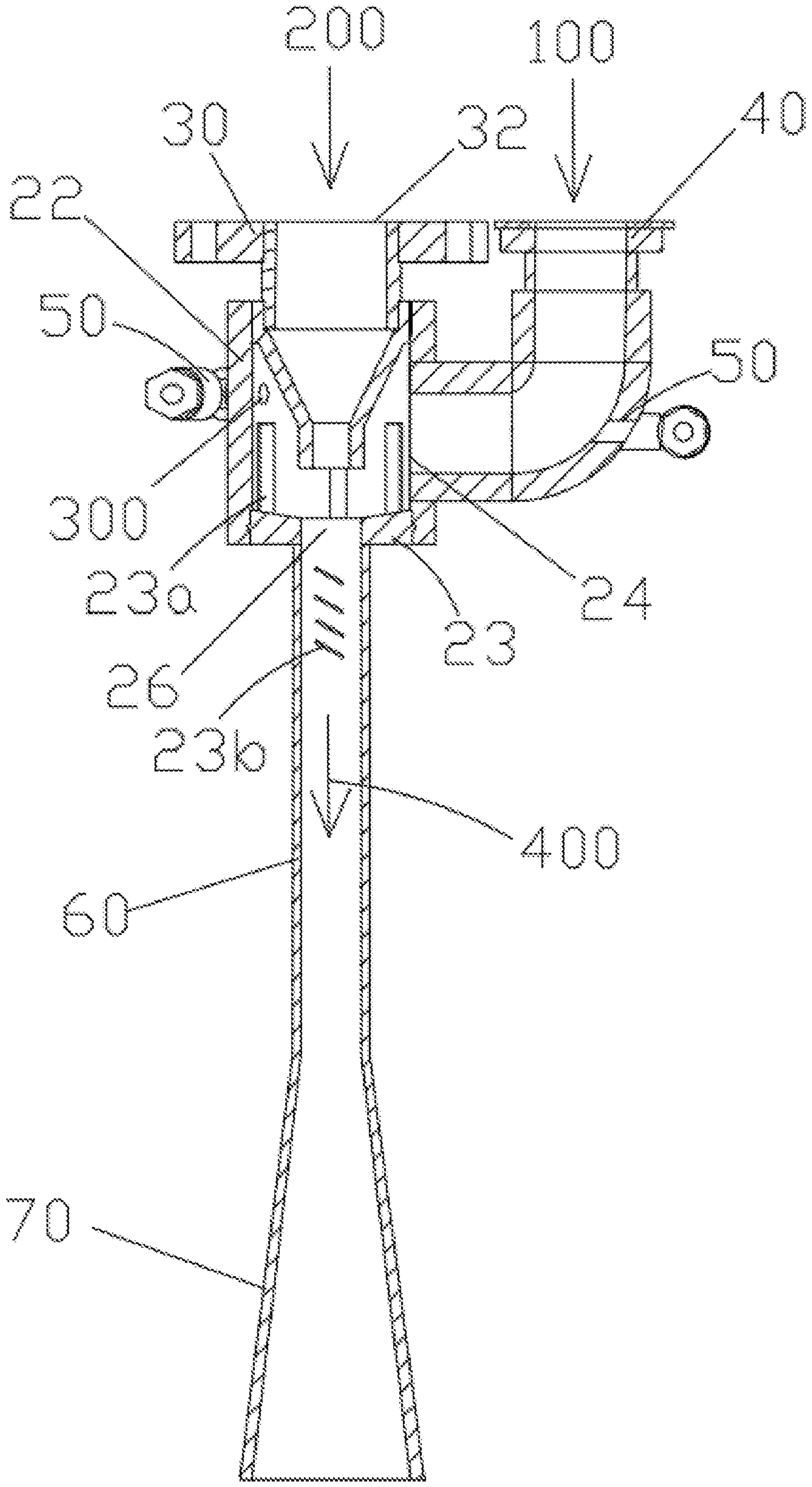
FIG. 10 is a cross-sectional side view of the self-cleaning negative-pressure ejector of the invention showing a schematic diagram of another automatic rotation design.

In addition, please refer to FIGS. 9 to 10, in another embodiment, the suction chamber 20 of the invention can optionally have a manual removal structure or a self-rotating removal structure to remove deposited solid particles and prevent the solid particles from depositing continuously. Taking the manual removal structure as an example, the bottom plate 23 of the discharge port 26 of the invention is sealed and rotatably disposed on the bottom side of the suction chamber 20, and a top side of the bottom plate 23 has one fin 23*a* or a plurality of fins 23*a*, thereby, a user can manually rotate the mixing pipe 60 to rotate the bottom plate 23, and then use the fin 23*a* to remove and prevent solid particles from depositing in the suction chamber 20. Taking the self-rotating removal structure as an example, the bottom plate 23 with the discharge port 26 of the invention is sealed and rotatably disposed on the bottom side of the suction chamber 20, the top side of the bottom plate 23 has one fin 23*a* or a plurality of fins 23*a*, the mixing pipe 60 and/or the bottom plate 23 have/has a design that can be automatically rotated by the flow of the second fluid 200 and/or the third fluid 300, and then the rotating fins 23*a* are used to remove and prevent solid particles from depositing in the suction chamber 20. Preferably, as shown in FIG. 9, the automatic rotation design can be achieved by the fins 23*a* fixedly disposed on the bottom plate 23. For example, position and height of the fins 23*a* are preferably disposed corresponding to position and height of a flushing member 50. When the flushing member 50 ejects the third fluid 300, the third fluid 300 is capable of impacting the fins 23*a* to drive the bottom plate 23 to rotate, that is, the fins 23*a* can rotate with the bottom plate 23 in the suction chamber 20, thereby effectively and automatically preventing solid particles from depositing in the suction chamber 20. Or, as shown in FIG. 10, this automatic rotation design can be achieved, for example, by optionally distributing a plurality of fins 23*b* on an inner wall of the mixing pipe 60, thereby when the second fluid 200 is injected into the mixing pipe 60, part of the second fluid 200 can flow along the fins 23*b* to drive the mixing pipe 60 to rotate, and then drive the bottom plate 23 and the fins 23*a* thereon to rotate. Or, taking the self-rotating removal structure as an example, the bottom plate 23 with the discharge port 26 of the invention is sealed and fixedly disposed on the bottom side of the suction chamber 20, and one fin 23*a* or a plurality of fins 23*a* has/have a rotating shaft and is/are disposed on the bottom plate 23 so that the fins 23*a* can be rotatably disposed on the bottom plate 23, wherein position and height of the fins 23*a* are preferably disposed corresponding to position and height of the flushing member 50 (as shown in FIG. 9), when the flushing member 50 ejects the third fluid 300, the third fluid 300 is capable of impacting the fins 23*a* to drive the fins 23*a* to rotate, thereby preventing solid particles from depositing or stripping off the deposited solid particles. A shape of the fin 23*a* can be, for example, a linear shape or an arcuate shape, as shown in FIGS. 9 and 10. However, the shape and a quantity of the fin 23*a* are not particularly limited, as long as the fin 23*a* can be pushed by the impact of the fluid or the bottom plate 23 can be driven to rotate to prevent solid particles from depositing or strip off the deposited solid particles, any shape or structure of the fin 23*a* can be applied to the invention.

The self-cleaning negative-pressure ejector 10 of the invention further optionally comprises a diffusion pipe 70, wherein an inlet end of the diffusion pipe 70 communicates with an outlet end of the mixing pipe 60. The diffusion pipe 70 is preferably a hollow pipe, and preferably a divergent funnel pipe, that is, the diffusion pipe 70 has a structure with a narrow top and a wide bottom. Openings at two sides of the diffusion pipe 70 have different diameters, and preferably a diameter of the inlet end of the diffusion pipe 70 is smaller than a diameter of an outlet end of the diffusion pipe 70, wherein a pipe wall between the inlet end and the outlet end of the diffusion pipe 70 is preferably inclined, that is, the diameter is gradually changed, or the pipe wall is inclined after extending in parallel, and an inclination angle can be adjusted according to actual requirements to achieve different diffusion effects. All or part of material of an overall structure or one or more than one component of the negative-pressure ejector 10 of the invention can be, for example, but not limited to, polyvinyl chloride (PVC), chlorinated polyvinyl chloride (CPVC), stainless steel, such as SUS304 or SUS316 stainless steel and its Teflon (PTFE) coating layer. Wherein a structure of the suction chamber 20 can be completely or partially transparent, or the structure of the suction chamber 20 can be completely or partially opaque. If the suction chamber 20 has a transparent structure, it is helpful for the user to visually observe whether there is a blockage.

The diffusion pipe 70 of the invention can be directly connected to the mixing pipe 60. In addition, the diffusion pipe 70 can also be indirectly connected to the mixing pipe 60. For example, a fixing sleeve 71 can optionally be provided between the diffusion pipe 70 and the mixing pipe 60 to increase a structural stability. Wherein one end of the fixing sleeve 71 is connected to the mixing pipe 60 and another end thereof is connected to the diffusion pipe 70, or the fixing sleeve 71 is located at a junction between the diffusion pipe 70 and the mixing pipe 60. However, the above structure is only an example, and is not intended to limit the invention. In addition, the negative-pressure ejector 10 of the invention can be an integrated or a combinational structure, wherein the suction chamber 20, the jet pipe 30, the mixing pipe 60 and/or the diffusion pipe 70 are an integrated or a combinational structure. Taking the diffusion pipe 70 with a combinational structure as an example, the diffusion pipe 70 of the invention can be formed by connecting two pipes or more than two pipes. However, the above structure is only an example, and is not intended to limit the invention.

Another technical feature of the invention is that the self-cleaning negative-pressure ejector 10 of the invention further comprises at least one flushing member 50. The flushing member 50 is preferably directly or indirectly connected to a third fluid pipeline 44 to communicate with the third fluid pipeline 44, wherein another side of the third fluid pipeline 44 is, for example, communicated with a third fluid supply tank (not shown in the figures) to supply the third fluid 300 into the suction chamber 20 and/or the first fluid pipeline 40. Since the second fluid 200 is ejected from the exit port 34 at the bottom end of the jet pipe 30 and enters the mixing pipe 60, solid particles may be deposited below and/or even above the exit port 34 to cause blockage, so a preferred disposing position of the flushing member 50 is located above the exit port 34 of the jet pipe 30, and more preferably located between a top end of the suction chamber 20 and the exit port 34 of the jet pipe 30, thereby achieving an efficacy of keeping the negative-pressure ejector 10 clean by removing solid particles deposited on the negative-pressure ejector 10 or preventing solid particles from depositing on the negative-pressure ejector 10. However, a disposing position of the flushing member 50 is only an example, and is not intended to limit the invention. For example, in other embodiment, the flushing member 50 can be located below the exit port 34 of the jet pipe 30.

In addition, the flushing member 50 or the third fluid pipeline 44, for example, can be controlled by a control component (not shown in the figures), so that the third fluid pipeline 44 can supply or stop supplying the third fluid 300 via the flushing member 50. The control component can be, for example, but is not limited to, a controller with a water pump or an electric control valve. The control component can adopt the existing technology, so it will not be described herein. A type of the flushing member 50 is not particularly limited, as long as the flushing member 50 is capable of ejecting a single liquid column or a plurality of liquid columns, it can be applied to the invention.

For example, the flushing member 50 can be, for example, a spray head, a nozzle, a pipe, an opening, or other suitable cleaning elements, as long as the flushing member 50 of the invention is capable of optionally ejecting the third fluid 300 to flush the suction chamber 20 and/or the first fluid pipeline 40, it is applicable to the invention. The flushing member 50 preferably ejects the third fluid 300 horizontally, that is, the third fluid 300 is preferably substantially perpendicular to a direction in which the second fluid 200 enters the suction chamber 20 to be capable of achieving better flushing and cleaning efficacies, but it is not limited thereto, the third fluid 300 can also be inclined toward the suction port 24 of the suction chamber 20 and/or the discharge port 26 of the suction chamber 20, or even be parallel to a direction in which the second fluid 200 enters the suction chamber 20, as long as blockage caused by solid particles can be effectively removed, it can be applied to the invention. The above is only examples and is not intended to limit the invention, that is, various flushing methods and designs belong to the scope of the invention.

In addition, the flushing member 50, for example, can be provided on the suction chamber 20, or can be provided on the first fluid pipeline 40, or can be provided on the suction chamber 20 and the first fluid pipeline 40 at the same time. Alternatively, the flushing member 50 can also be provided on the jet pipe 30 or the first fluid pipeline 40, in this case the third fluid 300 can be supplied by the third fluid pipeline 44 or by the jet pipe 30 or by the first fluid pipeline 40. Alternatively, the flushing member 50 can also be disposed at any position on the negative-pressure ejector 10 or even be disposed at a distance from the suction chamber 20. In other words, any structure, any type, any disposing position, or any quantity of the flushing member 50 can be applicable to the invention, as long as the flushing member 50 is capable of optionally ejecting the third fluid 300 to flush the suction chamber 20 and/or the first fluid pipeline 40. In addition, material and supply source of the third fluid 300 can be the same as or different from that of the second fluid 200.

A quantity of the flushing member 50 can be determined according to actual requirements, and can be one or more than one. If a quantity of the flushing member 50 is more than one, the flushing members 50, for example, can be distributed on a same horizontal plane (single-layer distribution) or on different horizontal planes (multi-layer distribution), or distributed at equal angles, thereby the third fluid 300 is ejected at equal angles. Taking a quantity of the flushing member 50 as three as an example, an included angle between the three flushing members 50 is preferably 120 degrees. In a similar way, the flushing members 50 of the invention are not limited to equiangular distribution, and the flushing members 50 can also be distributed at non-equal angles. Taking a quantity of the flushing member 50 as three as an example, the three flushing members 50 are preferably disposed in such a way that two of the flushing members 50 are located in the suction chamber 20, and one of the flushing members 50 is located on the first fluid pipeline 40. If the first fluid pipeline 40 has a place where solid particles can be deposited, such as a bend, the flushing member 50 is preferably located on the bend of the first fluid pipeline 40. In addition, in the invention, some or all of the flushing members 50 can be communicated with one another in series or in parallel via the third fluid pipeline 44 or other pipelines, or some or all of the flushing members 50 can also operate independently without being communicated with one another.

For example, the flushing members 50 can be commercially available three-way joints or three-way valves, or can be sequentially communicated with the third fluid pipeline 44 via a commercially available three-way joint or three-way valve, thereby the third fluid 300 supplied by the third fluid pipeline 44 can be ejected from the flushing members 50 at the same time or sequentially at a high speed toward a position in the suction chamber 20 and/or the first fluid pipeline 40 that may be or has been blocked. Moreover, a way in which the third fluid pipeline 44 supplies the third fluid 300 to the flushing members 50 can be based on a numerical value of the negative pressure, for example, determining whether a numerical value of the negative pressure exceeds a predetermined numerical value range, and/or based on time setting and/or frequency setting, such as fixed timing/fixed frequency, to be manually controlled or automatically controlled. Taking determining a numerical value as an example, the negative-pressure ejector 10 of the invention can be further provided with a pressure sensor (not shown in the figures), preferably disposing on the suction chamber 20 or the first fluid pipeline 40, thereby sensing a numerical value of the negative pressure, so that the user is capable of operating manually. Alternatively, the control component can also determine whether a numerical value of the negative pressure is within a predetermined numerical value range; if the result is no, the third fluid 300 is automatically supplied to clear blockage caused by solid particles. Since a person having ordinary skill in the art to which the invention pertains, based on the disclosure of the invention, should be able to understand how to control the flushing member 50 to produce a flushing effect, so it will not be described herein. In short, the flushing member 50 of the invention can adopt any existing structure or technology to achieve an efficacy of cleaning, preventing or removing solid blockage.

Another technical feature of the invention is that the flushing member 50 is capable of ejecting the third fluid 300 to achieve a self-cleaning efficacy when the suction chamber 20 substantially has a negative pressure, that is, the self-cleaning negative-pressure ejector 10 of the invention is capable of performing detersive operation of automatic dust cleaning under a non-stop operation state of the whole equipment, and substantially maintaining the jet pipe 10 in a negative-pressure state. However, the invention is also not limited to the above method, the self-cleaning negative-pressure ejector 10 of the invention is also capable of ejecting the third fluid 300 when the suction chamber 20 does not have a negative pressure substantially according to actual requirements, that is, performing detersive operation of automatic dust cleaning when operation of the whole equipment is shut down.

Figure 7:
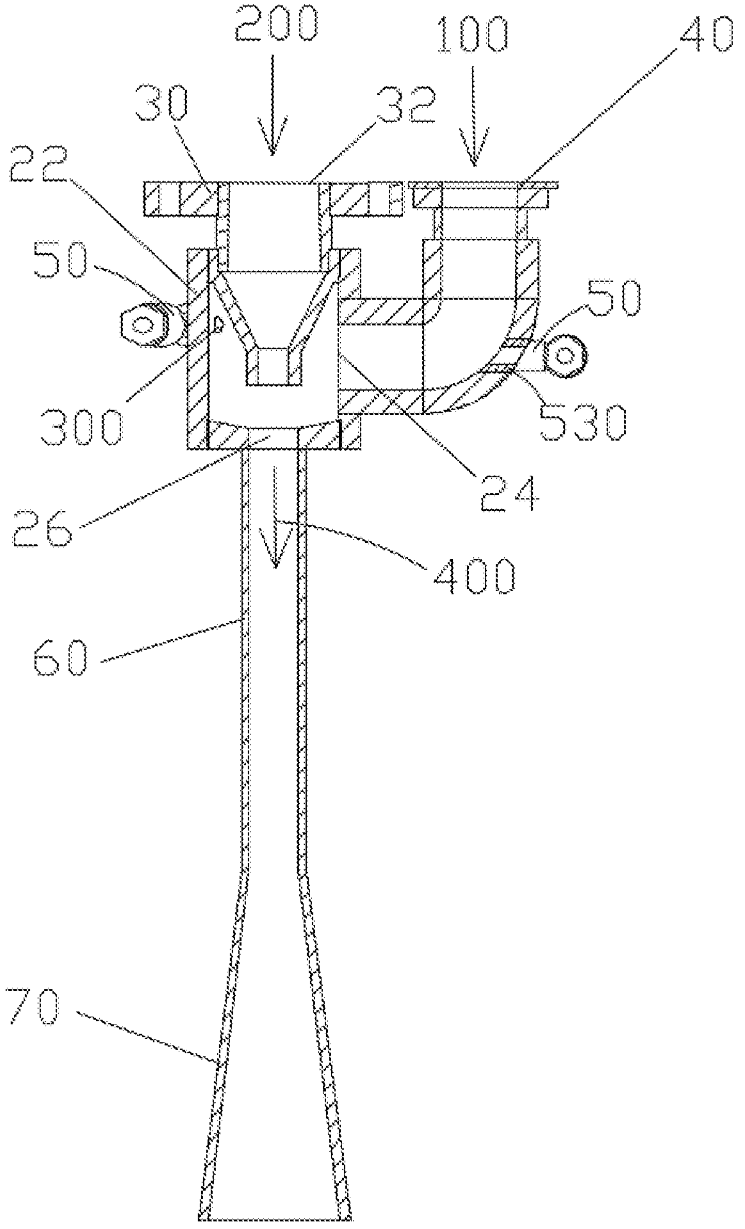
FIG. 7 is a cross-sectional side view of the self-cleaning negative-pressure ejector of the invention, wherein the negative-pressure ejector is an integrated structure.
Figure 8A:
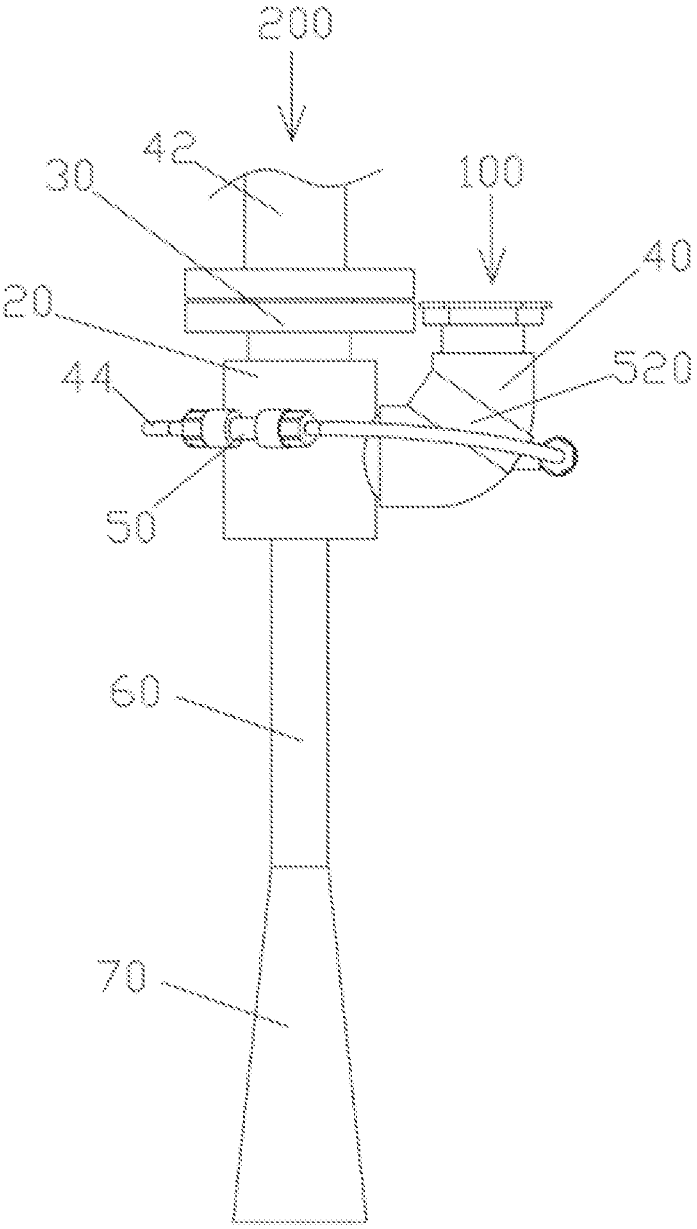
FIG. 8A is a side view of the self-cleaning negative-pressure ejector of the invention, wherein a flushing member is of an movable design.
Figure 8B:
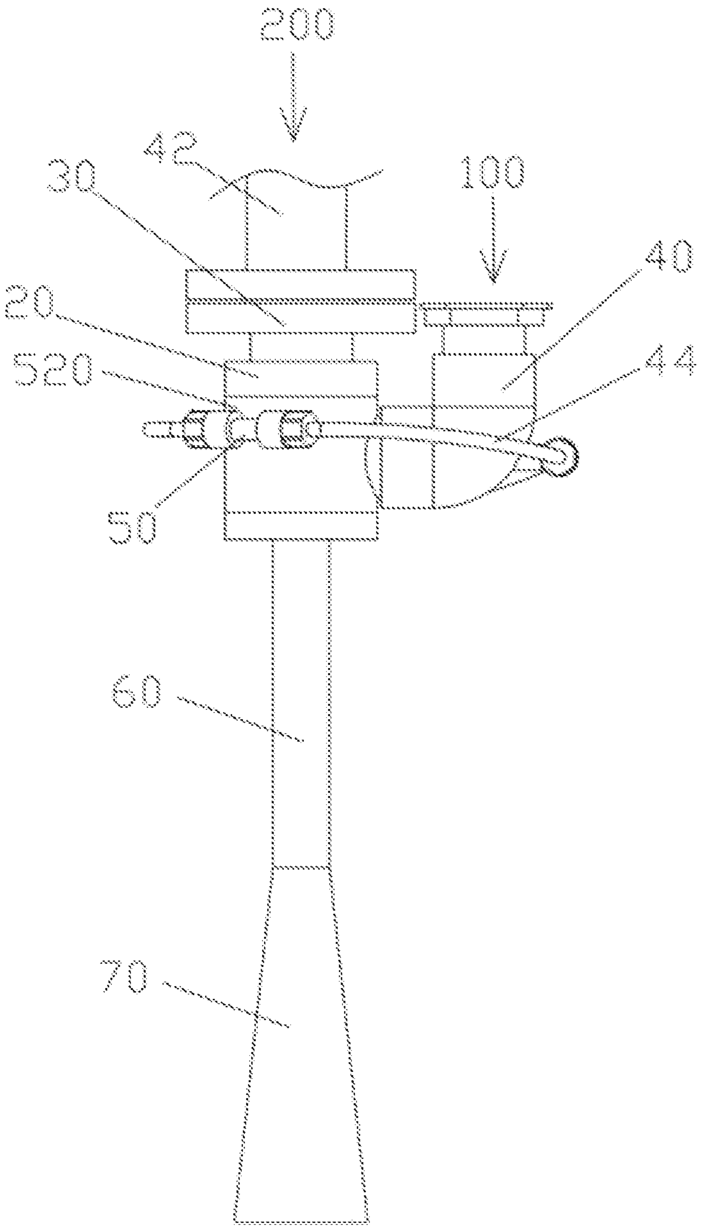
FIG. 8B is a side view of the self-cleaning negative-pressure ejector of the invention, wherein the flushing members are of another movable design.
Figure 11:
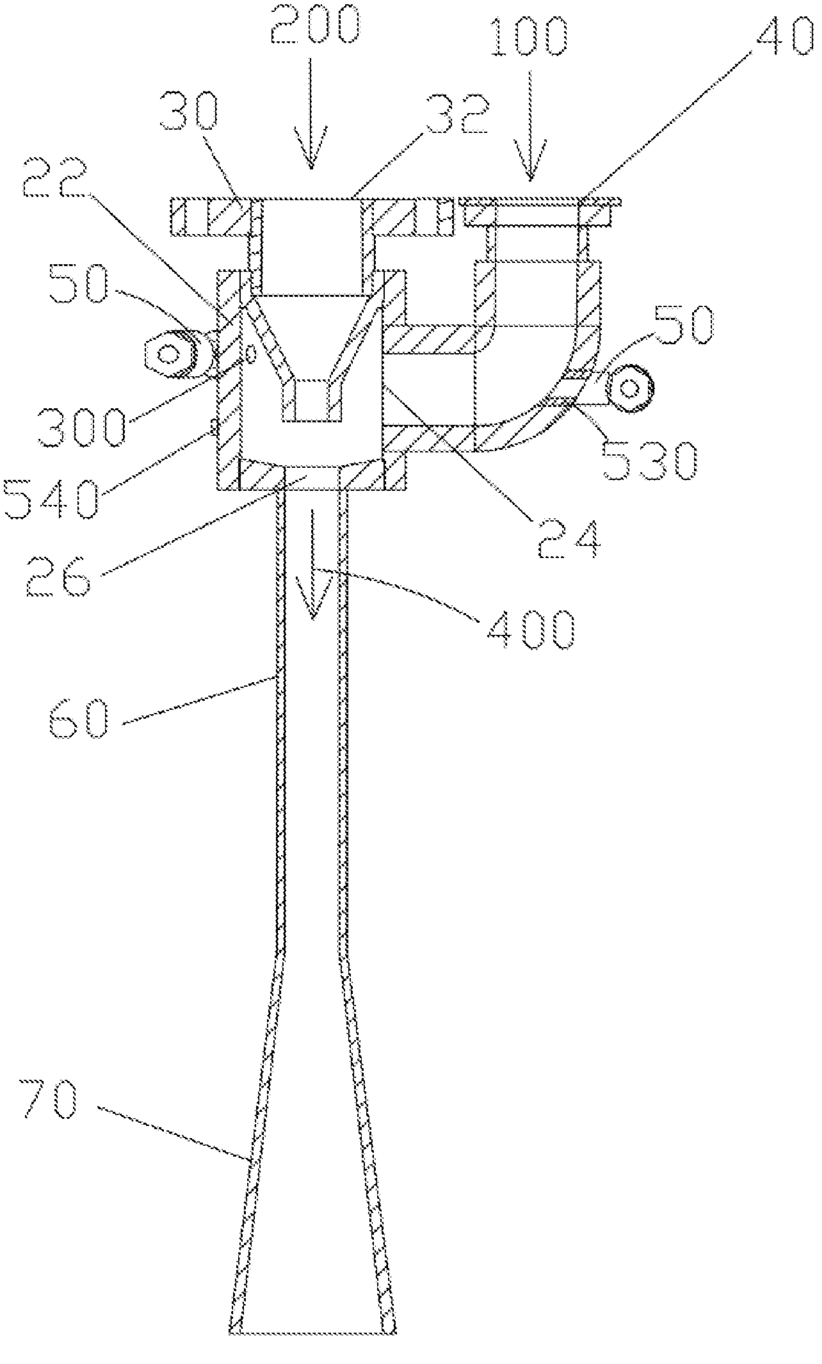
FIG. 11 is a cross-sectional side view of the self-cleaning negative-pressure ejector of the invention showing a schematic diagram of vibration design.

In addition, another technical feature of the invention is that one flushing member 50 or a plurality of flushing member 50 can be provided on the first fluid pipeline 40 and/or the suction chamber 20, a jetting direction of the flushing member 50 is, for example, a fixed type or a movable type, and for example, to continuously inject third fluid 300 into the first fluid pipeline 40 and/or the suction chamber 20 to generate a fixed jet pressure, or to inject the third fluid 300 into the first fluid pipeline 40 and/or the suction chamber 20 intermittently to generate a pulsed jet pressure. The third fluid 300 can be liquid, gas, and preferably liquid and gas in sequence. For example, taking the fixed arrangement as an example, the flushing member 50, for example, can be directly disposed on the first fluid pipeline 40 and/or the suction chamber 20, so that a jetting direction thereof is fixed. Or, taking the movable arrangement as an example, via a movable sleeve member 520 provided on the first fluid pipeline 40, such as a rotary socket tube (as shown in FIG. 8A) or a flexible sleeve connector 530 (as shown in FIG. 7), direction or angle of third fluid 300 injected by the flushing member 50 into the first fluid pipeline 40 can be adjusted in a movable manner. In addition, the flushing member 50 can also be provided on the first fluid pipeline 40 and/or the suction chamber 20 via the movable sleeve member 520 optionally, such as a rotary socket tube or a flexible sleeve connector (as shown in FIGS. 8A and 8B respectively). For the same reason, via the movable sleeve member 520 provided on the suction chamber 20 optionally, such as a rotary socket tube or a flexible sleeve connector, direction or angle of fluid injected by the flushing member 50 into the suction chamber 20 can be adjusted in a movable manner. Wherein, the flushing member 50 supplies the third fluid 300 into the first fluid pipeline 40 and/or the suction chamber 20 in a direction at a second included angle θ2 relative to a direction in which the first fluid 100 is sucked into the suction chamber 20. The second included angle θ2 is, for example, between 90 degrees and 180 degrees, preferably between 120 degrees and 180 degrees, and more preferably between 150 degrees and 180 degrees. In addition, the flushing member 50 preferably injects the third fluid 300 into the first fluid pipeline 40 along the center of the first fluid pipeline 40, and the flushing member 50 preferably injects the third fluid 300 into the first fluid pipeline 40 continuously. The gas of the third fluid 300 ejected through the flushing member 50 can be, for example, nitrogen gas or heated nitrogen gas. A flow rate of the third fluid 300 is, for example, between 0 SLM and 500 SLM, preferably between 0 SLM and 200 SLM, and more preferably between 0 SLM and 60 SLM. Taking the movable sleeve member 520 as a rotary socket tube as an example, the movable sleeve member 520, for example, can be rotatably provided on the first fluid pipeline 40 (FIG. 8A) and/or the suction chamber 20 (FIG. 8B), so that the flushing member 50 is capable of swinging back and forth around the first fluid pipeline 40 and/or the suction chamber 20 to change direction or angle. For example, an outer side of the rotary socket tube can have a gear, wherein the gear meshes with another gear on a driving motor, and the other gear is connected to a rotating shaft of the driving motor. When a negative pressure of the suction chamber 20 decreases, for example, dropping below a preset value, the rotating shaft of the driving motor is capable of rotating back and forth, thereby causing the rotary socket tube to swing back and forth to make a fluid ejected by the flushing member 50 to be more fully in contact with a pipe wall, which is capable of effectively removing deposition of solid particles and keeping the pipe wall dry. In addition, the rotary socket tube can also be operated at a predetermined time or at a predetermined frequency, for example, according to a time setting or a frequency setting. For example, taking the movable sleeve member 520 as a flexible sleeve connector as an example, the movable sleeve member 520, for example, can be a soft sealing ring with a perforation, wherein the soft sealing ring is connected to a pipe wall hole and the perforation is sleeved with the flushing member 50, thereby the user can hold the flushing member 50 to adjust direction or angle of the third fluid 300 injected into the first fluid pipeline 40 and/or the suction chamber 20. Alternatively, the movable sleeve member 520 such as the flexible sleeve connector or the rotary socket tube, and/or the suction chamber 20 can also be provided with a vibrator 540 (as shown in FIG. 11), for example, when a negative pressure of the suction chamber 20 decreases, for example, dropping below a preset value, the vibrator 540 can be operated to cause the flexible sleeve connector and the flushing member 50 sleeved with the flexible sleeve connector and/or the suction chamber 20 to produce vibration, thereby causing a fluid ejected by the flushing member 50 due to vibration to be more fully in contact with the pipe wall, which is capable of effectively removing deposition of solid particles and keeping the pipe wall dry. In addition, the vibrator of the flexible sleeve connector can also be operated continuously or at a predetermined time or at a predetermined frequency, for example, according to a time setting or a frequency setting.

For example, the flushing member 50 can be a commercially available three-way joint or three-way valve. If a quantity of the flushing member 50 is more than one, the flushing member 50 can be sequentially communicated with a third fluid pipeline 44 via a commercially available three-way joint or three-way valve, thereby the gas of the third fluid 300 supplied by the third fluid pipeline 44 can be injected into the first fluid pipeline 40 at a high speed by the flushing member 50, thereby removing water vapor remaining in the first fluid pipeline 40 by the flushing member 50 during a flushing process, and preventing solid particles from depositing. In addition, the flushing member 50, for example, can be disposed at different heights of the first fluid pipeline 40, and for example, are disposed around the first fluid pipeline 40.

Taking treatment of process waste gas as an example, the first fluid 100 is preferably a gas, such as an exhaust gas of tail gases, and is, for example, a process waste gas generated in a semiconductor manufacturing process, and the second fluid 200 is preferably a liquid, such as liquid water, water-containing solution, or other washing liquids, such as alkaline solutions. For example, a washing liquid composed of fresh water is effectively sufficient to be applied to capture dusts or solid particles, wherein an aqueous solution of washing liquid is capable of moistening and capturing dusts or particles. In addition, a washing liquid composed of fresh water and sodium hydroxide or other neutralizers (such as lime) is capable of effectively extracting and neutralizing a large amount of acidic substances, such as hydrochloric acid, sulfuric acid or other acid-containing components in a waste gas. Since acidic substances such as hydrochloric acid and sulfuric acid dissolve in water very easily, if there is a suitable alkali in a washing liquid composed of water, such as calcium hydroxide ($Ca(OH)_2$), calcium carbonate ($CaCO_3$), and/or sodium bicarbonate ($NaHCO_3$) capable of dissolving in water, acidic components in various production sources can be absorbed and neutralized to reduce the formation of acidic solutions.

Figure 12:
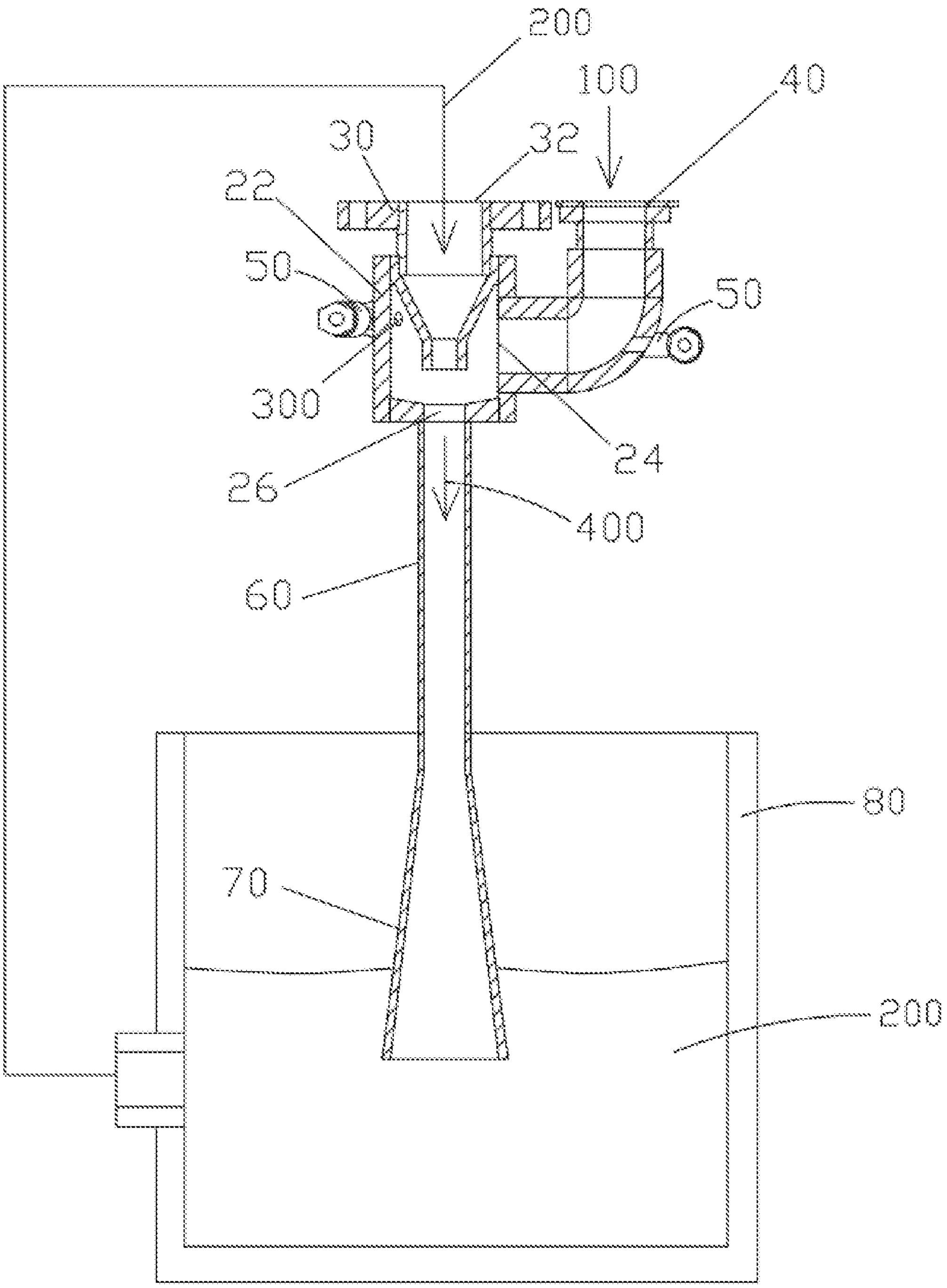
FIG. 12 is a schematic diagram of the self-cleaning negative-pressure ejector of the invention applied to an exhaust gas treatment device.

If the self-cleaning negative-pressure ejector 10 of the invention is disposed in a processing tank 80 (as shown in FIG. 12) to form an exhaust gas processing device, a composition of the second fluid 200 is preferably determined based on the to-be-treated first fluid 100 (e.g. gas), the second fluid 200 (e.g. liquid) is preferably contained in the processing tank 80, and is cyclically supplied to the jet pipe 30 via a pipeline for ejection from the exit port 34, with the first fluid 100 (gas) in the first fluid pipeline 40 being sucked by a high negative pressure generated by the principle of a venturi tube, a water-gas mixed fluid is formed. When the water-gas mixed fluid enters the mixing pipe 60, the diffusion pipe 70 or the second fluid 200 in the processing tank 80, the first fluid 100 (gas) will be cut into microbubbles due to pressure changes, and movement is linear with high energy efficiency. In addition, since the self-cleaning negative-pressure ejector 10 of the invention is capable of performing detersive operation of automatic dust cleaning under a non-stop operation state of the whole equipment, that is, the invention is capable of maintaining a negative-pressure value in real time, and capable of keeping a motor power low with less exhaust gas in real time. Therefore, taking PM2.5 microparticle as an example, the invention is capable of maintaining a 97% removal rate in real time, and has an energy-saving effect.

In various embodiments of the invention, the third fluid 300 can be, for example, a continuously supplied gas, liquid or gas mixing with liquid to generate a fixed flushing pressure, or an intermittently supplied gas, liquid or gas mixing with liquid to generate a pulsed flushing pressure. The gas can be, for example, air, nitrogen, inert gas or other suitable gases, and the liquid can be, for example, liquid water, water-containing solution, or other suitable solutions such as washing liquid, but is not limited thereto. For example, the third fluid 300 can also be a liquid and a gas supplied in sequence, for example, after supplying liquid for a period of time, changed to supplying gas for another period of time. Since the third fluid 300 supplied lastly is a gas, a residual washing liquid can be blown dry to prevent the residual washing liquid from causing particle deposition. For example, when the third fluid 300 is a gas, a flow rate of the third fluid 300 ejected from the flushing member 50 ranges from about 200 SLM to 4,000 SLM. When the third fluid 300 is a liquid, a flow rate of the third fluid 300 ejected from the flushing member 50 ranges from about 200 SLM to 4,000 SLM.

In summary, according to the self-cleaning negative-pressure ejector of the invention, one or more of the following advantages can be provided: (1) Capable of generating high negative pressure to suck gas and solving the problem of blockage of solid particles in the fluid pipelines. (2) Having a self-cleaning function capable of performing detersive operation of automatic dust cleaning under a non-stop operation state of the whole equipment. (3) Capable of self-clearing solid blockage on the pipe walls of the negative-pressure ejector and the first fluid pipeline by using gas and/or liquid jets. (4) A direction in which the first fluid being sucked is inclined relative to an ejection direction of the second fluid, thereby capable of preventing solid particles from depositing in the first fluid pipeline. (5) Capable of removing water vapor remaining in the first fluid pipeline during a flushing process and preventing solid particles from depositing by ejecting a third fluid into the first fluid pipeline. (6) A length of the suction chamber can be extended to reduce a frequency of engineering staff cleaning the suction chamber manually. (7) The entire device of the negative-pressure ejector has no consumables, no risk of breakage, has long service life and the components can be replaced conveniently.

Note that the specification relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. A self-cleaning negative-pressure ejector comprising:

a suction chamber, a side wall of the suction chamber having at least one suction port, the suction port being used for communicating with a first fluid pipeline;

a jet pipe, an exit port of the jet pipe being disposed in the suction chamber and ejecting a second fluid so that a negative pressure being generated in the suction chamber, and a first fluid in the first fluid pipeline entering the suction chamber, wherein a first included angle is between a direction in which the first fluid being sucked into the suction chamber and an ejection direction of the second fluid; and at least one flushing member used for continuously providing a third fluid to clean the suction chamber and the first fluid pipeline to generate a fixed flushing pressure or intermittently providing the third fluid to clean the suction chamber and the first fluid pipeline to generate a pulsed flushing pressure according to a numerical value of the negative pressure, a time setting or a frequency setting for removing solid particles deposited in the suction chamber and the first fluid pipeline, wherein the suction chamber has a bottom plate rotatably disposed on a bottom of the suction chamber, and at least one fin is disposed on the bottom plate for removing solid particles deposited in the suction chamber and the first fluid pipeline during the rotation of the fin.

2. The self-cleaning negative-pressure ejector as claimed in claim 1, wherein the third fluid is a gas, a liquid or the gas mixing with the liquid.

3. The self-cleaning negative-pressure ejector as claimed in claim 1, wherein the third fluid is a liquid and a gas supplied in sequence to remove solid particles deposited in the suction chamber and the first fluid pipeline, and remove a liquid remaining in the suction chamber when the flushing member cleans the suction chamber.

4. The self-cleaning negative-pressure ejector as claimed in claim 1, wherein the first included angle is 90 degrees.

5. The self-cleaning negative-pressure ejector as claimed in claim 1, wherein the flushing member supplies the third fluid into the first fluid pipeline and/or the suction chamber in a direction at a second included angle relative to a direction in which the first fluid is sucked into the suction chamber, the second included angle is between 90 degrees and 180 degrees.

6. The self-cleaning negative-pressure ejector as claimed in claim 1, wherein a numerical ratio of a first distance between the exit port of the jet pipe and a discharge port of the suction chamber to a second distance between the exit port of the jet pipe and the suction port of the suction chamber is between 0.5 and 2.5.

7. The self-cleaning negative-pressure ejector as claimed in claim 1, further comprising a mixing pipe communicated with the suction chamber for mixing the first fluid with the second fluid to produce a mixed fluid; and a diffusion pipe communicated with the mixing pipe for spraying the mixed fluid.

8. The self-cleaning negative-pressure ejector as claimed in claim 1, wherein a quantity of the at least one flushing member is more than one, and some or all of the flushing members communicate with one another in series, in parallel, or do not communicate with one another.

9. The self-cleaning negative-pressure ejector as claimed in claim 1, wherein the flushing member is fixedly disposed on the suction chamber and the first fluid pipeline to inject the third fluid into the suction chamber and the first fluid pipeline for removing solid particles deposited in the suction chamber and the first fluid pipeline.

10. The self-cleaning negative-pressure ejector as claimed in claim 1, wherein the flushing member is movably disposed on the suction chamber and the first fluid pipeline via a movable sleeve member to movably inject the third fluid into the suction chamber and the first fluid pipeline for removing solid particles deposited in the suction chamber and the first fluid pipeline.

11. The self-cleaning negative-pressure ejector as claimed in claim 10, wherein the movable sleeve member is a rotary socket tube or a flexible sleeve connector.

12. The self-cleaning negative-pressure ejector as claimed in claim 10, wherein the movable sleeve member and/or the suction chamber is provided with a vibrator.

13. The self-cleaning negative-pressure ejector as claimed in claim 12, wherein the vibrator is operated continuously or at a predetermined time or at a predetermined frequency or operated when the negative pressure is dropped below a preset value.

14. The self-cleaning negative-pressure ejector as claimed in claim 10, wherein the movable sleeve member is operated according to the numerical value of the negative pressure, the time setting, or the frequency setting.

15. The self-cleaning negative-pressure ejector as claimed in claim 1, wherein a height and a position of the fin correspond to the flushing member such that the fin can be rotated by the third fluid ejected out from the flushing member.

16. The self-cleaning negative-pressure ejector as claimed in claim 1, wherein the bottom plate communicates with a mixing pipe, and at least another fin is disposed on the mixing pipe such that the fin can be rotated by the second fluid ejected out from the jet pipe.

* * * * *